Patented Sept. 29, 1931

1,825,252

UNITED STATES PATENT OFFICE

BERT S. TAYLOR, OF AKRON, OHIO, ASSIGNOR TO THE B. F. GOODRICH COMPANY, OF NEW YORK, N. Y., A CORPORATION OF NEW YORK

METHOD OF DECORATING RUBBER

No Drawing. Application filed April 19, 1929. Serial No. 356,602.

This invention relates to the art of manufacturing rubber articles, and particularly such articles as are desired to exhibit a pleasing or artistic surface.

Rubber articles manufactured by the usual processes ordinarily have a rather dull and displeasing surface, even when coated with a glossy varnish such as an ammoniacal shellac solution. It is particularly desirable that such articles as hot-water bottles, balls, toy balloons, shower bath curtains, and especially articles of wearing apparel such as bath caps, belts, bathing shoes, rubber aprons, etc. be provided with a pleasing and durable surface.

This invention comprises improving the appearance of rubber articles by applying thereto an adhesive composition, dusting the surface with a metal powder, and covering the metal powder with a protective coating. The metal powder imparts a very pleasing metallic lustre to the rubber article, without, however, detracting from its strength or elasticity. The layer of metal powder, having excellent reflecting properties, prevents the penetration of light into the body of the rubber, and hence preserves the rubber from the deleterious effect of sunlight, which rapidly stiffens and cracks unprotected rubber.

The products prepared by the method of this invention exhibit numerous advantages over rubber which is colored by incorporating aluminum bronze or other similar metal powder therein. Such rubber, into which the bronze is incorporated by milling or other equivalent process, contains the aluminum bronze in random relation, some of the flakes being parallel to the surface, but the greater proportion being at an angle to the surface or even presenting their edges thereto. The result is that it can never exhibit the brilliant surface which is attained by the method of the present invention. Furthermore, the large quantity of aluminum bronze which must be incorporated into rubber in order to give the desired color not only stiffens and weakens the rubber unduly, but increases the cost, especially when the colored bronzes are employed.

The process of this invention may be applied either to vulcanized or unvulcanized rubber articles, but in any case the rubber is preferably formed substantially to its final shape before the surface is treated. If the rubber article is unvulcanized, the surface in many cases is sufficiently tacky to receive the metal powder without the application of a distinct coating of an adhesive cement. The rubber and the coating may, if desired, be subjected to vulcanization by any of the usual methods, say by heating in air. If the rubber article is vulcanized before the coating is applied, an adhesive surface must be provided by coating the rubber with an adhesive cement. Any adhesive which is sufficiently elastic to stretch with the rubber and which adheres satisfactorily thereto may be employed. For example, plasticized nitrocellulose, plasticized varnish, shellac solution, or rubber, give satisfactory results, but in general rubber cements will be preferred because of their superior elasticity, transparency, and adhesiveness.

The metal powder which is applied to the surface of the rubber is preferably the flaked aluminum commonly termed "aluminum bronze", although other metals such as flaked copper or brass may be substituted therefor either in whole or in part. The aluminum bronze has a permanent high luster which is practically unaffected by the free sulphur usually present in rubber goods. The metal dust may be prepared in almost any conceivable color by treating the particles with a suitable organic dye. Very beautiful effects may be obtained by employing these colored bronzes, which may be applied over a base of rubber of the same color or of a contrasting color. The bronze may be applied over the whole surface of the article or over any portion thereof, in a pattern or design, or different portions of the article may be coated with different colors of bronze. The metal powder is dusted on the adhesive surface of the rubber article, and the excess is brushed off. The flakes of the bronze powder, lying in closely-spaced relation on the surface of the adhesive, give the appearance of a continuous polished metal surface.

The surface, after the application of the metal powder, is coated with a protective layer which assists in holding the metal powder in place, preventing it from rubbing off or discoloring other objects with which the treated rubber is brought in contact. The coating is also valuable in preserving the metal powder against change due to atmospheric or other influences. The coating may be of any of the classes mentioned as adhesives above, or of any other material which forms a transparent, elastic, and adherent surface. If rubber is employed, it should subsequently be vulcanized, since unvulcanized rubber is soft and sticky.

*Example 1.*—A decorated bath cap may be prepared as follows: A rubber bath cap is prepared in the ordinary manner, say by vulcanizing in a mold. The vulcanized bath cap, say of green rubber, is painted with a thin rubber cement, which is allowed to dry for a moment. Colored aluminum bronze, say of a green color similar to the color of the rubber, is dusted over the entire exterior surface of the bath cap, which is then brushed with a cloth to remove the excess of the bronze powder which is not in direct contact with the rubber base. Another layer of thin rubber cement is painted over the bronze powder and allowed to dry. The surface is then vulcanized by exposing it for a few minutes to the vapors of sulphur chloride.

The finished bath cap has a brilliant metallic lustre which is not affected by stretching the rubber, nor by friction nor by exposure to the atmosphere. The rubber is only very slowly affected by sunlight, since the metal powder prevents the penetration of the rays below the surface of the rubber.

*Example 2.*—The surface of vulcanized rubberized fabric is painted with a thin rubber cement which is allowed to dry for a short time. Uncolored aluminum bronze is dusted uniformly over the surface, the excess being brushed off. The surface is then painted with a solution of white shellac in strong aqueous ammonia. The rubberized cloth has a permanent bright silvery lustre.

It is to be understood that the specific embodiments hereinabove described are merely illustrative and that the method and product are susceptible of numerous modifications without departing from the spirit and scope of the invention as defined in the appended claims.

I claim:

1. A decorated soft rubber article comprising a vulcanized colored, extensible rubber base, a single layer of finely divided, flaked metal uniformly distributed over at least a portion of the base, and a transparent extensible coating over the metal layer.

2. A decorated soft rubber article comprising a vulcanized colored, extensible rubber base, a single layer of finely divided, flaked aluminum uniformly distributed over at least a portion of the base, and a transparent extensible coating over the metal layer.

3. A decorated soft rubber article comprising a vulcanized colored, extensible rubber base, a single layer of finely divided, colored, flaked aluminum uniformly distributed over at least a portion of the base, and a transparent extensible vulcanized rubber coating over the metal layer.

In witness whereof I have hereunto set my hand this 13th day of April, 1929.

BERT S. TAYLOR.